(12) United States Patent
Allgaier

(10) Patent No.: US 10,037,431 B2
(45) Date of Patent: Jul. 31, 2018

(54) SOFTWARE-AS-A-SERVICE REFERENCE PROCESS EXTENSION VERIFICATION FRAMEWORK

(71) Applicant: SAP SE, Walldorf (DE)

(72) Inventor: Matthias Allgaier, Bernstadt (DE)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 14/974,713

(22) Filed: Dec. 18, 2015

(65) Prior Publication Data

US 2017/0177882 A1    Jun. 22, 2017

(51) Int. Cl.
*G06F 21/60* (2013.01)
*G06N 5/02* (2006.01)

(52) U.S. Cl.
CPC ........... *G06F 21/604* (2013.01); *G06N 5/025* (2013.01)

(58) Field of Classification Search
CPC ......... G06F 21/60; G06F 21/604; G06N 5/02; G06N 5/022; G06N 5/025
See application file for complete search history.

(56) References Cited

U.S. PATENT DOCUMENTS

| 8,707,261 | B2 | 4/2014 | Heller et al. |
| 8,868,751 | B2 | 10/2014 | Kylau et al. |
| 8,935,191 | B2 | 1/2015 | Allgaier |
| 9,389,928 | B1* | 7/2016 | Surti .................... G06F 9/54 |
| 2005/0166193 | A1* | 7/2005 | Smith .................. G06F 8/75 |
| | | | 717/143 |
| 2007/0157159 | A1 | 7/2007 | Fildebrandt et al. |
| 2008/0155555 | A1* | 6/2008 | Kwong ................. G06F 8/20 |
| | | | 719/315 |
| 2009/0216731 | A1 | 8/2009 | Markovic |
| 2012/0197811 | A1* | 8/2012 | Kearney ............ G06Q 10/087 |
| | | | 705/304 |

(Continued)

OTHER PUBLICATIONS

Yu et al., Pattern Based Property Specification and Verification for Service Composition, Oct. 23, 2006, WEB Information Systems—Wise 2006 Lecture Notes in Computer Science; LNCS, Springer, Berlin, DE, pp. 156-168.*

(Continued)

*Primary Examiner* — Khang Do
(74) *Attorney, Agent, or Firm* — Fish & Richardson P.C.

(57) ABSTRACT

The disclosure describes methods, software, and systems, including a method for providing extension points for core process models. Extension points are provided for a core process model associated with a core process. The extension points are pre-defined and annotated with constraints that specify restricted behavior of extensions plugged into the core process model at the extension points. The extension points are formulated in a process extension constraint definition language and allow a restriction of runtime behavior. The process extension constraint definition language is based on temporal logic and enhances existing property specification patterns with specific support to formulate constraints at an extension task type level for activities included in a process extension. Instructions are received from a user to plug selected extensions into an instance of the core process model. Each selected extension includes user-customized behavior for the extension. The instance of the core process model is validated.

15 Claims, 13 Drawing Sheets

(56) References Cited

U.S. PATENT DOCUMENTS

| | | | | |
|---|---|---|---|---|
| 2012/0221709 A1* | 8/2012 | Bowes | ............... | G06Q 30/0268 709/224 |
| 2012/0323618 A1 | 12/2012 | Allgaier et al. | | |
| 2012/0330699 A1 | 12/2012 | Allgaier | | |
| 2013/0262504 A1 | 10/2013 | Allgaier | | |
| 2013/0297544 A1* | 11/2013 | Allgaier | ................... | G06N 5/04 706/46 |
| 2014/0137079 A1* | 5/2014 | Witteborg | ................. | G06F 8/71 717/120 |

OTHER PUBLICATIONS

Communication re extended European Search Report for related EP Appl. No. 16002562.3-1954 dated May 29, 2017; 8 pages.
Jian Yu et al. "Pattern Based Property Specification and Verification for Service Composition", Oct. 23, 2006; WEB Information Systems—Wise 2006 Lecture Notes in Computer Science; LNCS, Springer, Berlin, DE, pp. 156-168 (XP019047514.
Ahmed Awad et al. "Efficient Compliance Checking Using BPMN-Q and Temporal Logic", Sep. 2, 2008; Business Process Management; Lecture Notices in Computer Science; Springer, Berlin, DE, pp. 326-341 (XP019103954).
Communication re extended European Search Report for related EP Appl. No. 16002561.5-1952 dated May 15, 2017; 9 pages.

* cited by examiner

```
1  ********************************************************************
2  * CONSTRAINT C3 | SOURCE: EXTENSION POINT CP-101
3  * ABSENCE UPDATE CORE DATA STEP ALL GLOBALLY
4  ********************************************************************
5  FORMULA
6  ALLPATH ALWAYS (NOT (ET3 > 0))
7
8  ********************************************************************
9  * CONSTRAINT C4 | SOURCE: GENERAL DOMAIN KNOWLEDGE
10 * EXISTENCE ENCRYPT MESSAGE STEP ONE GLOBALLY
11 ********************************************************************
12 FORMULA
13 ALLPATH EVENTUALLY ( (ET2 > 0) )
14
15 ********************************************************************
16 * CONSTRAINT C5 | SOURCE: GENERAL DOMAIN KNOWLEDGE
17 * EXISTENCE DECRYPT MESSAGE STEP ONE GLOBALLY
18 ********************************************************************
19 FORMULA
20 ALLPATH EVENTUALLY ( (ET5 > 0) )
21
22 ********************************************************************
23 * CONSTRAINT C6 | SOURCE: GENERAL DOMAIN KNOWLEDGE
24 * RESPONSE ONE DECRYPT MESG. STEP ONE ENCRYPT MESG. STEP GLOBALLY
25 ********************************************************************
26 FORMULA
27 ALLPATH ALWAYS ( (NOT (ET2 > 0) ) OR ALLPATH EVENTUALLY ( (ET5 > 0) ) )
28
```

SOFTWARE-AS-A-SERVICE REFERENCE PROCESS EXTENSION VERIFICATION FRAMEWORK

CROSS-REFERENCE TO RELATED APPLICATIONS

This application is a co-pending application of U.S. application Ser. No. 14/974,662,filed on Dec. 18, 2015 entitled "CONTROLLED REFERENCE PROCESS EXTENSIBILITY FRAMEWORK"; the entire contents of which are incorporated herein by reference.

BACKGROUND

Multiple types of software-as-a-service (SaaS) enterprise systems are typically available in industry. The majority of the systems document their core reference processes as informal flowcharts, e.g., shipped as part of their product documentation. Typical SaaS products do not provide a capability to explicitly model and constrain the behavior of process extensions, e.g., modeled in a business process modeling language such as Business Process Model and Notation (BPMN).

Various academic approaches can be used in the business process management (BPM) research field that deal with the verification of business process models and workflows. However, the approaches do not deal with constraining the behavior of process extensions in the context of SaaS-based enterprise software. In some implementations, better approaches can be used that build on temporal logic and model-checking principles as foundational methods. For example, solutions can formulate platform extension constraints on the type level of activities contained in an extension fragment.

SUMMARY

The disclosure generally describes computer-implemented methods, software, and systems for validating extensions of a core process model. For example, extension points can be provided for a core process model associated with a core process. The extension points can be pre-defined and stored by a core process model provider. The extension points can be annotated with constraints specifying restricted behavior of extensions plugged into the core process model at the extension points. The extension points can adhere to a process extension constraint definition language. The extension points can be exposed, by the core process model provider, to users of the core process model, e.g., presented in a user interface. Instructions can be received from a user to plug selected extensions into an instance of the core process model. Each selected extension can include user-customized behavior for the extension to be executed at a corresponding extension point when the core process executes. The instance of the core process model can be validated. For each extension, the user-customized behavior can be validated against the restricted behavior specified by the constraints.

In some implementations, one computer-implemented method includes: providing extension points for a core process model associated with a core process, the extension points being pre-defined and stored by a core process model provider and annotated with constraints specifying restricted behavior of extensions plugged into the core process model at the extension points, the extension points adhering to a process extension constraint definition language; exposing, by the core process model provider, the extension points to users of the core process model; receiving, from a user, instructions to plug selected extensions into an instance of the core process model, each selected extension including user-customized behavior for the extension to be executed at a corresponding extension point when the core process executes; and validating the instance of the core process model including, for each extension, validating the user-customized behavior against the restricted behavior specified by the constraints.

The foregoing and other implementations can each optionally include one or more of the following features, alone or in combination. In particular, one implementation can include all the following features:

In a first aspect, combinable with any of the previous aspects, the method further comprises transforming the core process into a different format before validating the instance of the core process model.

In a second aspect, combinable with any of the previous aspects, validating the instance of the core process model includes process extension model checking based on computational tree logic (CTL) and property specification patterns.

In a third aspect, combinable with any of the previous aspects, validating the instance of the core process model includes using constraint semantics indicating a relevancy and a behavior of validation rules for extension task instances.

In a fourth aspect, combinable with any of the previous aspects, the extension points are part of an application domain included in a software-as-a-service (SaaS), cloud-based enterprise system that extends reference processes provided by a SaaS provider to customers and partners.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 10 is a block diagram illustrating example generated computational tree logic (CTL) formulas for platform extension constraints, according to an implementation.

Like reference numbers and designations in the various drawings indicate like elements.

DETAILED DESCRIPTION

Figure 1:
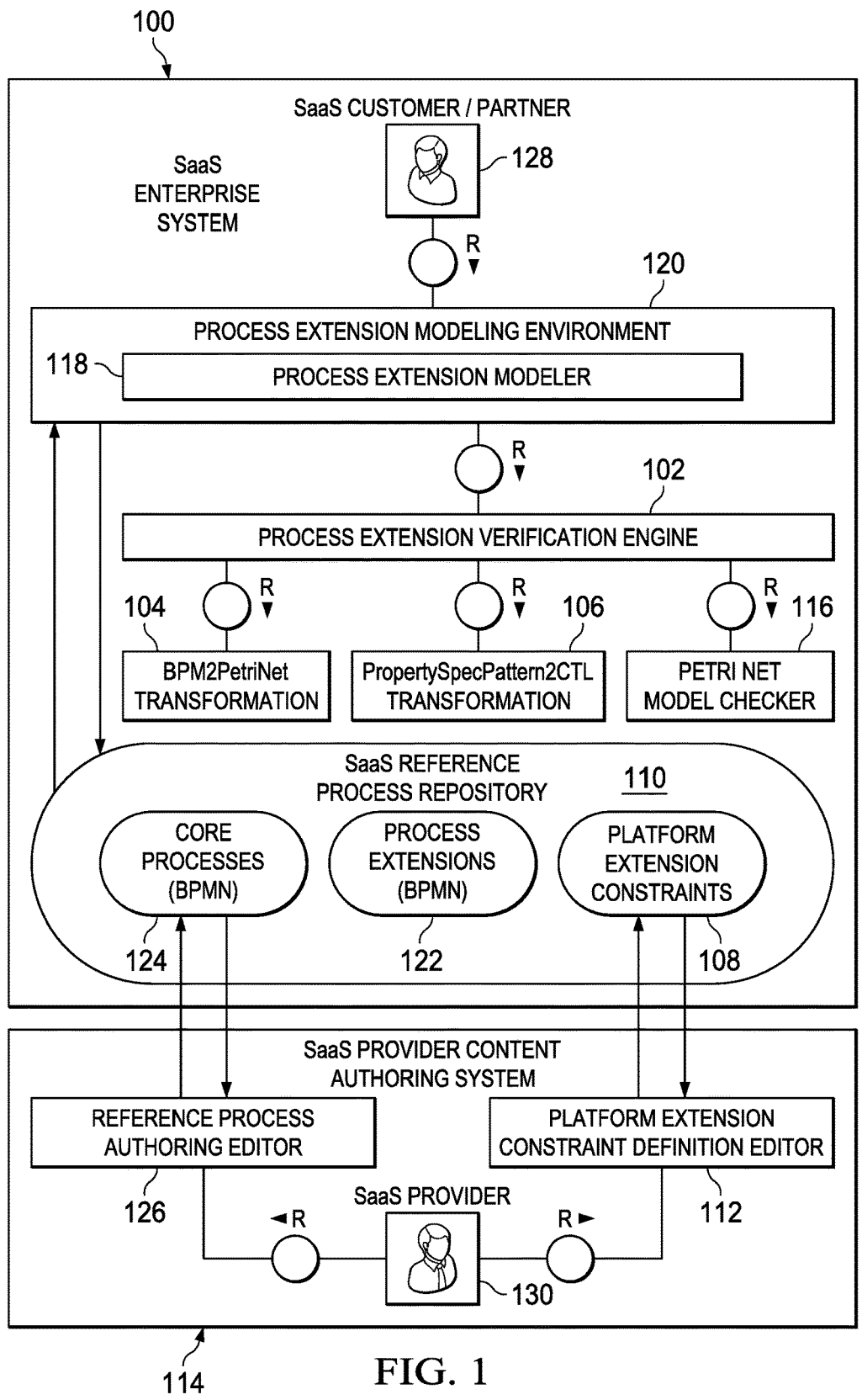
FIG. 1 is a block diagram illustrating an example system architecture of a SaaS reference process extension verification framework for a Software-as-a-Service (SaaS) enterprise system, according to an implementation.

This disclosure generally describes computer-implemented methods, software, and systems for validating extensions of a core process model. For example, extension points are provided for a core process model associated with a core process, the extension points being pre-defined and stored by a core process model provider and annotated with constraints specifying restricted behavior of extensions plugged into the core process model at the extension points, the extension points adhering to a process extension constraint definition language. The extension points are exposed, by the core process model provider, to users of the core process model. Instructions are received from a user to plug selected extensions into an instance of the core process model, each selected extension including user-customized behavior for the extension to be executed at a corresponding extension point when the core process executes. The instance of the core process model is validated including, for each extension, validating the user-customized behavior against the restricted behavior specified by the constraints.

In cloud-based enterprise systems, the same business applications can be consumed by many customers, such as in a Software-as-a-Service (SaaS) delivery model. The adaptation of a cloud-based enterprise system to the specific needs of customers is typically a key requirement. For this purpose, SaaS providers can expose comprehensive configuration and extension capabilities (e.g., Platform-as-a-Service). A key challenge in these capabilities is the extension of reference processes (e.g., that are shipped by the SaaS provider) by customers and partners. In some implementations, as multiple customers share the same SaaS platform, a SaaS provider can constrain the behavior of plugged-in extensions in order that the overall integrity and stability of the SaaS platform is guaranteed (e.g., controlled reference process extensibility).

This disclosure describes a SaaS reference process extension verification framework that includes the following contributions going beyond state-of-the-art systems in industry and science. First, a process extension constraint definition language can allow extension points exposed by a core SaaS reference process model to be annotated with constraints that restrict the behavior of plugged-in extensions. This domain specific language can address the needs of SaaS providers to define constraints on the behavior of process extensions. The language can be based, for example, on temporal logic and can enhance existing property specification patterns with specific support, e.g., to formulate constraints at the type level for activities contained in a process extension. Second, a process extension model-checking algorithm can allow transforming the enhanced property specification patterns to computation tree logic (CTL). Process extensions modeled in a core set of Business Processes Modeling and Notation (BPMN) elements can be transformed, for example, into Petri nets and checked against the platform constraints by applying model checking principles.

FIG. 1 is a block diagram illustrating an example of a system architecture of a SaaS reference process extension verification framework for a SaaS enterprise system 100, according to an implementation. For example, FIG. 1 shows the components of the framework and their interactions. Components proposed by this disclosure include, for example, a process extension verification engine 102, a BPMN to Petri net transformation component 104, a property specification pattern to CTL transformation component 106, platform extension constraints 108 (e.g., from a SaaS reference process repository 110), and a platform extension constraint definition editor 112 (e.g., from a SaaS provider content authoring system 114). Components that can be reused from state-of-the-art components include a Petri net model checker 116. Components that can be reused from state-of-the-art components and extended by this disclosure can include, for example, a process extension modeler 118 (e.g., from a process extension modeling environment 120), process extensions 122, core processes 124 (e.g., BPMN), and a reference process authoring editor 126. The SaaS enterprise system 100 can serve at least one SaaS customer/partner 128 and at least one SaaS provider 130. Other configurations are possible.

Figure 2:
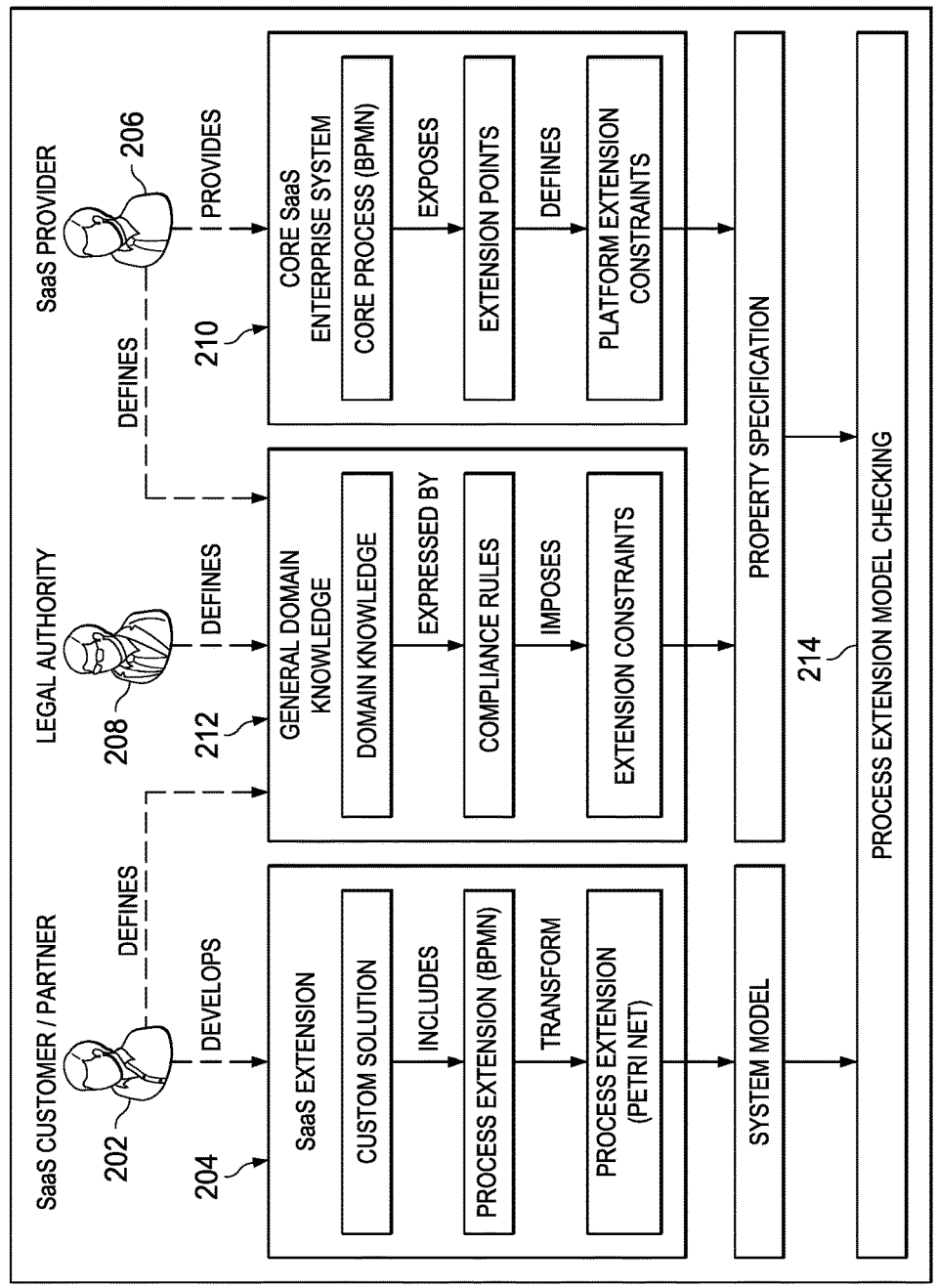
FIG. 2 is a block diagram illustrating an example development/definition flow for a SaaS reference process extension verification framework, according to an implementation.

FIG. 2 is a block diagram illustrating an example development/definition flow 200 for a SaaS reference process extension verification framework, according to an implementation. For example, the basic principle of the process extension model checking approach is shown in FIG. 2. A SaaS customer or partner 202 can develop a process extension 204 that needs to be verified, e.g., to determine whether it adheres to the constraints defined by a SaaS provider 206 for a specific extension point. Optionally, the framework foresees to integrate constraints and compliance rules defined by legal authorities 208. Process extensions can be modeled in BPMN and can be transformed into the Petri net format as a prerequisite for the model checking approach.

In some implementations, the framework can support at least two different categories of compliance checks, e.g., a compliance check using core platform extension constraints 210 and a compliance check using general domain knowledge 212.

In the compliance check using core platform extension constraints 210, for example, the SaaS provider 206 can enrich an extension point with platform extension constraints that define what an extension is allowed to do (or not to do). A process extension model check 214 can be provided that verifies whether the process extension adheres to these restrictions. This can guarantee, for example, that the core SaaS enterprise system is only extended within the defined boundaries (e.g., providing stability).

For the compliance check using general domain knowledge 212, for example, constraints can originate from company-wide design guidelines. Furthermore, compliance requirements can originate from quality standards and legal regulations, e.g., from Sarbanes-Oxley, Basel II, or ISO 9000. These and/or other regulations can define compliance requirements for business processes, e.g., to ensure that process extensions comply with these regulations. To implement these principles, this disclosure describes the process extension constraint definition language for property specification as well as a corresponding process extension model checking algorithm.

In some implementations, process extension model checking can be based on foundations such as a CTL foundation and a property specification patterns foundation. In the CTL foundation, for example, a system model can describe the behavior of a system in an unambiguous way. For example, the system can be abstracted using a finite set of states and transitions that describe how the system evolves from one state into another. System requirements can typically be described using property specification languages based on temporal logic. Model checking can be used as a verification technique that explores all possible system states in order to check, e.g., whether a certain property is satisfied or not. This approach can build on CTL as a foundation to formalize platform extension constraints.

In the transition system foundation, for example, a transition system TS can describe the behavior of a software system and can be defined by the following tuple:

$$TS=(S, Act, \rightarrow, I, AP, L) \quad (1)$$

where S is a finite set of states, Act is a set of actions, $\rightarrow \supseteq S \times Act \times S$ is a transition relation, $I \subseteq S$ is a set of initial states, AP is a set of atomic propositions, and $L: S \rightarrow 2^{AP}$ is a labeling function. A state $s \in S$ can describe some information of a system at a certain moment in time. An action $\alpha \in Act$ can describe the transition between two states.

Figures 3A, 3B:
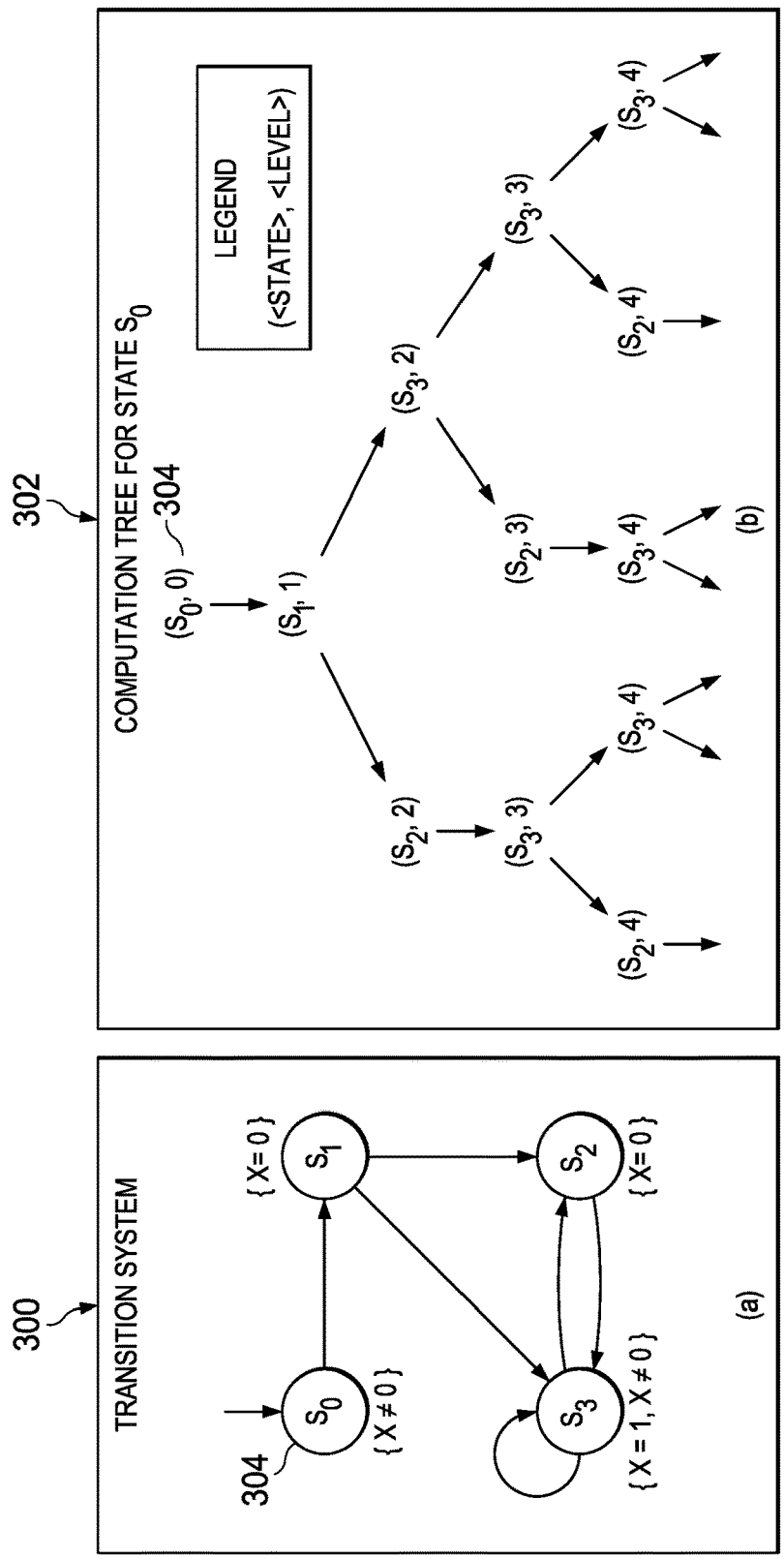
FIG. 3A is a block diagram illustrating an example of a sample transition system, according to an implementation.
FIG. 3B is a block diagram illustrating an example of an infinite computation tree that corresponds to the transition system 300, according to an implementation.

FIG. 3A is a block diagram illustrating an example of a sample transition system 300, according to an implementation. FIG. 3B is a block diagram illustrating an example of an infinite computation tree 302 that corresponds to the transition system 300, according to an implementation. For example, the transition system 300 and the corresponding infinite computation tree 302 can begin as a state $s_0$ 304.

A labeling function L relates a set $(s) \in 2^{AP}$ of atomic propositions to any state s of the transition system. (s) stands for exactly those atomic propositions $\alpha \in AP$ that are satisfied by state s. Given that $\Phi$ is a propositional logic formula, then the state s satisfies the formula $\Phi$ iff the evaluation induced by (s) makes the formula $\Phi$ true. The abbreviation "iff" stands for "if and only if" and $2^{AP}$ denotes the power set of AP.

Table 1 summarizes basic CTL formulas. Let TS=(S, Act,$\rightarrow$,I,AP,L) be a transition system, and let $(s_i, s_{i+1}, \ldots)$ be a path that is outgoing from state $s_i \in S$. Let $\varphi \in AP$ and $\omega \in AP$ be an atomic proposition.

TABLE 1

CTL Formulas

| Formula | Semantic |
|---|---|
| AX($\varphi$) | All paths starting from $s_i$, $\varphi$ has to hold in the next states |
| AG($\varphi$) | All paths starting from $s_i$, $\varphi$ has to hold Globally in all states |
| AF($\varphi$) | All paths starting from $s_i$, $\varphi$ has to hold in some Future states |
| EX($\varphi$) | Exists at least one path starting from $s_i$, where $\varphi$ has to hold in the next state |
| EG($\varphi$) | Exists at least one path starting from $s_i$, where $\varphi$ has to hold Globally in all states |
| EF($\varphi$) | Exists at least one path starting from $s_i$, where $\varphi$ has to hold in some Future state |

TABLE 1-continued

CTL Formulas

| Formula | Semantic |
|---|---|
| A($\varphi$ U $\omega$) | All paths starting from $s_i$, $\varphi$ has to hold until some state where $\omega$ holds |
| A($\varphi$ W $\omega$) | See A($\varphi$ U $\omega$) however no guarantee that a state is reached where $\omega$ holds |
| E($\varphi$ U $\omega$) | Exists at least one path starting from $s_i$, where $\varphi$ has to until some state where $\omega$ holds |
| E($\varphi$ W $\omega$) | See E($\varphi$ U $\omega$) however no guarantee that a state is reached where $\omega$ holds |

Although property specification languages such as CTL can provide very powerful means for defining behavioral constraints, it may be difficult for SaaS providers and customers to use the language as a solid mathematical background is needed. This limitation can provide the motivation, for example, to use property specification patterns as the foundation in a platform extension constraint language. For example, a property specification pattern can be a generalized description of a commonly occurring requirement on the permissible state/event sequences in a finite state model of a system.

Each property specification can consist of at least a pattern and a scope. For example, the pattern part can specify what must occur, and the scope part can specify when the pattern must hold. Each property specification pattern can include a description on how the pattern can be mapped into formal languages, e.g., supporting a mapping to CTL.

Table 2 summarizes patterns, e.g., that can be divided into occurrence and order patterns. Symbols P and Q represent a given state/event of the system model.

TABLE 2

Pattern Hierarchy

| Pattern | Type | Semantic |
|---|---|---|
| Absence | Occurrence | P does not occur within a scope |
| Universality | Occurrence | P occurs throughout a scope |
| Existence | Occurrence | P must occur within a scope |
| Bounded Existence | Occurrence | P must occur at least/exactly/at most k times within a scope |
| Precedence | Order | P must always be preceded by Q within a scope |
| Response | Order | P must always be followed by Q within a scope |

A scope can define, for example, the starting and ending states/events for a pattern (e.g., See Table 3). The symbols P and Q represent a given state and event of the system model, respectively. "Globally," when used as a scope, means that the pattern must hold during the entire system execution. "Before" means that the pattern must hold at the first occurrence of a given state P. "After" means that the pattern must hold after the first occurrence of a given P. "Between/And" means that the pattern must hold from an occurrence of a given P to an occurrence of a given Q. "After/Until" is identical to "Between/And," but the pattern must hold even if Q never occurs.

TABLE 3

Pattern Scope

| Scope | Semantic |
|---|---|
| Globally | The pattern must hold during the entire system execution |
| Before | The pattern must hold up to the first occurrence of a given P. |

TABLE 3-continued

Pattern Scope

| Scope | Semantic |
| --- | --- |
| After | The pattern must hold after the first occurrence of a given P. |
| Between/And | The pattern must hold from an occurrence of a given P to an occurrence of a given Q |
| After/Until | The same as "Between/And", but the pattern must hold even if Q never occurs. |

Platform extension constraint languages can address, for example, specific requirements to specify constraints on task types of process extensions in the context of SaaS enterprise systems. The constraints can include, for example, compliance constraints for extension task types. In order to address the requirement for controlled reference process extensibility, the SaaS provider can formulate certain compliance constraints that define what process extensions are allowed to do (or not do) in order to guarantee the overall stability of the core enterprise system. When the shipment of the core SaaS enterprise system is shipped, for example, the provider does not know the specific process extensions that will be developed by SaaS customers and partners. Nevertheless, the SaaS provider needs to formulate constraints that the process extensions need to satisfy when plugged into certain extension points of the core SaaS enterprise system. This includes constraints on the occurrence of certain activities within a process extension, e.g., the absence of activities that delete or update data from the core SaaS enterprise system to guarantee read-only extensions for a certain extension point. In addition, general domain knowledge in the context of process extension modeling can constrain the order of certain activities (e.g., a constraint indicating that a message encryption activity must always be executed before the response message from an external message is decrypted). Constraints can be formulated on types of extension tasks rather than on task instances. This requires enhancing existing property specification patterns with additional semantics.

Figure 4:
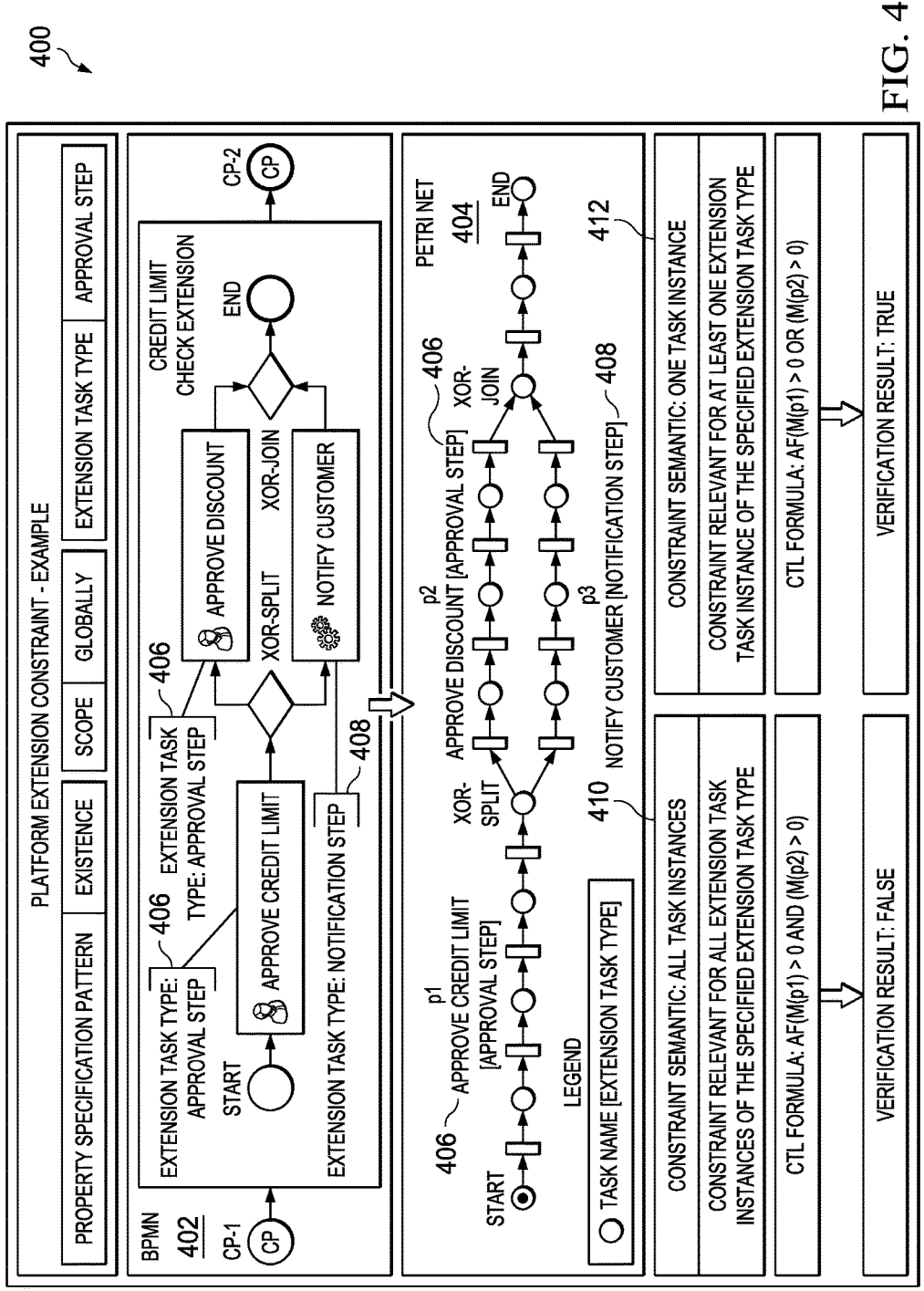
FIG. 4 is a block diagram illustrating an example of a platform extension constraint, according to an implementation.

FIG. 4 is a block diagram illustrating an example of a platform extension constraint, according to an implementation. For example, FIG. 4 shows two interpretation semantics, e.g., a BPMN format 402 and a Petri net format 404, for a process extension with a simple credit limit check consisting of three extension tasks. Extensions in the process include an approval step extension task type 406 and a notification step extension task type 408.

The extensions are shown in BPMN format 402 and in the corresponding Petri net format 404. The process extension has been plugged into a core SaaS reference process. This example expresses that in the process extension model PE, an extension task t of type T='ApprovalStep' must occur when applying an existence pattern. However, a process extension model can contain multiple task instances $t_i$ relating to a specified extension task type T, and this can lead to two different interpretation semantics of the existence pattern. In CTL, for example, an Exists Globally pattern can be expressed using the formula (Q), where Q represents a certain state that the process extension model must satisfy. In this case, the state of a process extension model PE can be expressed using a marking function M:P→N of its Petri net representation. Approval task instances $t_1$ and $t_2$, that both refer to the extension task type T, have been mapped to the places $p_1$ and $p_2$ in the Petri net.

Referring to FIG. 4, two interpretation semantics are shown when applying the pattern to extension task types. First, an "All Task Instances" constraint semantic 410 indicates that the constraint is relevant for all task instances $t_i$ relating to the given extension task type T. The pattern holds for the process extension PE and the extension task type T, if there is a state during the execution of PE, where all task instances $t_i$ related to the extension task type T are active (executed). This means that there is a state where there is a token in $p_1$ and $p_2$. Applying this interpretation semantic of the Exists Globally pattern to our example, the process extension model would not satisfy this constraint:

$$((p1)>0 \wedge (M(p2)>0)) \qquad (2)$$

Second, an "At Least One Task Instance" constraint semantic 412 indicates that the constraint is relevant for at least one task instance $t_i$ relating to the given extension task type T. The pattern holds for the process extension PE and the extension task type T, if there is a state during the execution of PE, where at least one task instance $t_i$ related to the extension task type T is active (executed). This means that there is a state where there is a token in $p_1$ or in $p_2$. Applying this interpretation semantic of the Exists Globally pattern to the example, the process extension model would satisfy this constraint:

$$((p_1)>0 \vee ((p_2)>0)) \qquad (3)$$

When dealing with constraints on the extension task type level, it can be beneficial to consider both interpretation semantics for each property specification pattern.

The process extension constraint definition language described herein can extend the property specification patterns from with additional semantics for formalizing constraints on a task type level to address the outlined SaaS process extension requirements.

Figure 5:
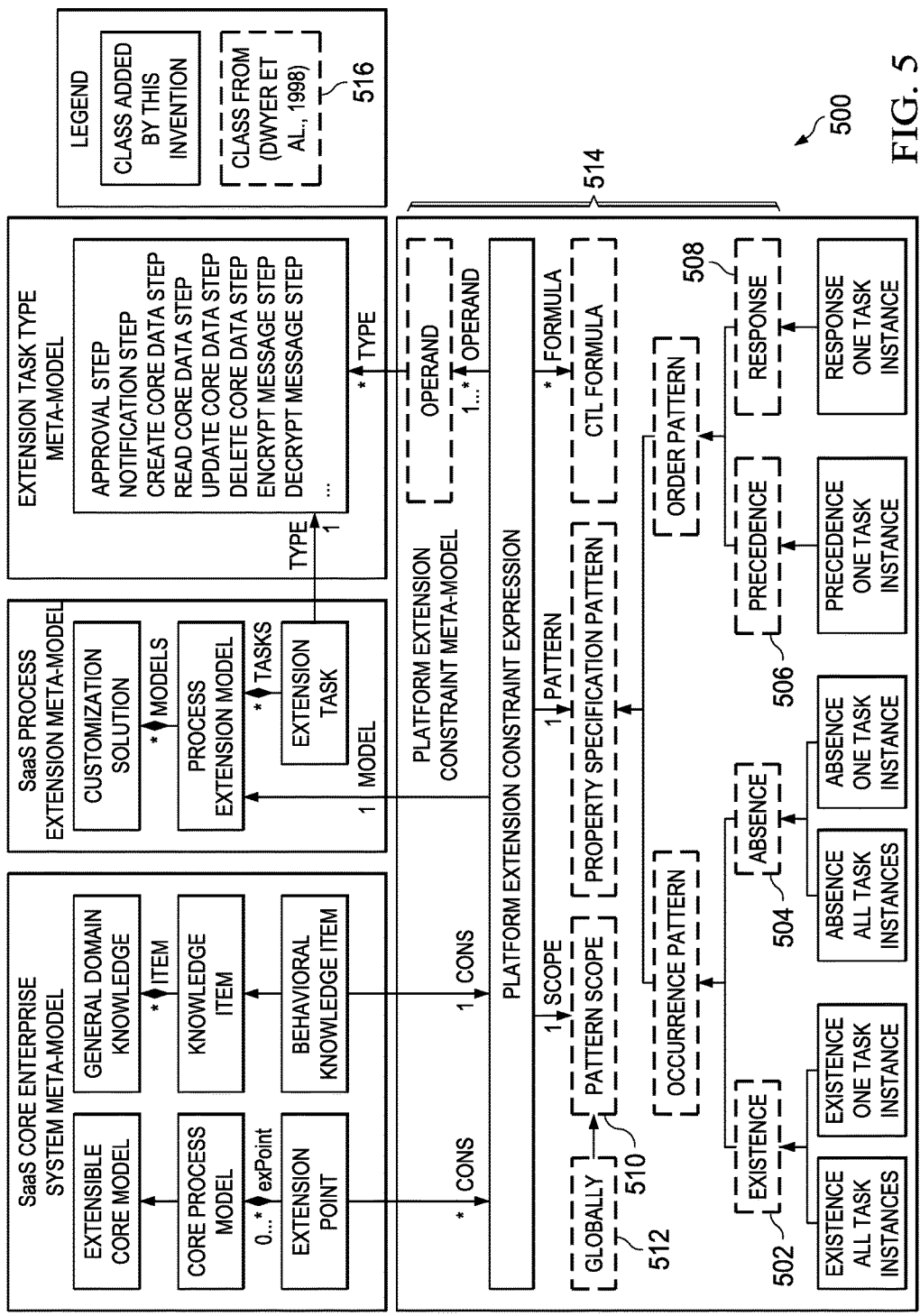
FIG. 5 is a block diagram illustrating an example meta-model for the process extension constraint definition language, according to an implementation.

FIG. 5 is a block diagram illustrating an example meta-model 500 for the process extension constraint definition language, according to an implementation. The meta-model focuses on a core set of patterns: existence 502, absence 504, precedence 506, and response 508. For each of these patterns 502-508, a semantic is added that refers to either all or at least one instance for a given extension task. A scope 510 of each pattern 502-508 can be restricted to Globally 512, meaning that each pattern 502-508 must hold during the entire execution of the process extension model.

All extended patterns can be integrated into the SaaS core enterprise system meta-model, the SaaS process extension meta-model and the extension task type meta-model. Classes 514 can include constructs that can be imported 516, and the remaining classes can be provided by this disclosure.

In some implementations, definitions can be used that refine the property specification patterns, e.g., with additional semantics for the formulation of platform extension constraints on an extension task type level as required in the context of SaaS reference process extensibility. In some implementations, patterns can include the following types of patterns.

Definition 1 (e.g., Existence All Task Instances Globally) is a pattern that can hold, for the process extension PE and the extension task type T, if there is a state during the execution of PE, where all task instances $t_i$ related to the extension task type T are active (executed). The Petri net marking function $(t_i)$ can determine the number of tokens in the place that relates to $t_i$. In Equation 4, let n denote the total number of task instances contained in PE that relate to the extension task type T.

$$\text{ExistenceAllTaskInstGlobally}(PE, T) = AF((\Sigma_{i=1}^{n} |M(t_i)>0|)=n) \qquad (4)$$

Definition 2 (e.g., Existence At Least One Task Instance Globally) is a pattern that can hold, for the process extension PE and the extension task type T, if there is a state during the execution of PE where at least one task instance $t_i$ related to the extension task type T is active (executed). The Petri net marking function $(t_i)$ can determine the number of tokens in the place that relates to $t_i$.

$$\text{ExistenceAllTaskInstGlobally}(PE, T) = AF((\Sigma_{i=1}^{n}|M(t_i)>0|) \geq 1) \quad (5)$$

Definition 3 (e.g., Absence All Task Instances Globally) is a pattern that can hold, for the process extension PE and the extension task type T, if there is never a state during the execution of PE, where all task instances $t_i$ related to the extension task type T are active (executed). The Petri net marking function $(t_i)$ can determine the number of tokens in the place that relates to $t_i$. In Equation 6, let n denote the total number of task instances contained in PE that relate to the extension task type T.

$$\text{AbsenceAllTaskInstGlobally}(PE, T) = AG(!((\Sigma_{i=1}^{n}|M(t_i)>0|) = n)) \quad (6)$$

Definition 4 (e.g., Absence At Least One Task Instance Globally) is a pattern that can hold, for the process extension PE and the extension task type T, if there is never a state during the execution of PE, where at least one task instance $t_i$ related to the extension task type T is active (executed). The Petri net marking function $(t_i)$ can determine the number of tokens in the place that relates to $t_i$.

$$\text{AbsenceAllTaskInstGlobally}(PE, T) = AG(!((\Sigma_{i=1}^{n}|M(t_i) \geq 0|) > 1)) \quad (7)$$

Definition 5 (e.g., Precedence At Least One Task Instance Globally) is a pattern that can hold, for the process extension PE and the extension task types $T_A$ and $T_B$, if there is a state during the execution of PE where at least one task instance $t_{Ai}$ related to the extension task type $T_A$ precedes at least one task instance $t_{Bi}$ related to the extension task type $T_B$. The Petri net marking function $(t_{Ai})$ can determine the number of tokens in the place that relates to $t_{Ai}$ and $(t_{Bi})$ determines the number of tokens in the place that relates to $t_{Bi}$.

$$\text{PrecedenceOne}T(PE, T_A, T_B) = A(!\varphi W \omega) \quad (8)$$

The atomic propositions can be defined as follows:

$$\varphi = (\Sigma_{i=1}^{n}|M(t_{Bi})>0|) \geq 1 \text{ and } \varphi = (\Sigma_{i=1}^{z}|M(t_{Ai})>0|) \geq 1 \quad (9)$$

Definition 6 (e.g., Response At Least One Task Instance) is a pattern that can hold, for the process extension PE and the extension task types $T_A$ and $T_B$, if there is a state during the execution of PE, where at least one task instance $t_{Ai}$ related to the extension task type $T_A$ follows at least one task instance $t_{Bi}$ related to the extension task type $T_B$. The Petri net marking function $(t_{Ai})$ can determine the number of tokens in the place that relates to $t_{Ai}$, and Petri net marking function $(t_{Bi})$ can determine the number of tokens in the place that relates to $t_{Bi}$.

$$\text{ResponseOne}T(PE, T_A, T_B) = AG(\varphi \rightarrow AF(\omega)) \quad (10)$$

In some implementations, atomic propositions can be defined as follows:

$$\varphi = (\Sigma_{i=1}^{n}|M(t_{Bi})>0|) \geq 1 \text{ and } \varphi = (\Sigma_{i=1}^{z}|M(t_{Ai})>0|) \geq 1 \quad (11)$$

Figure 6:
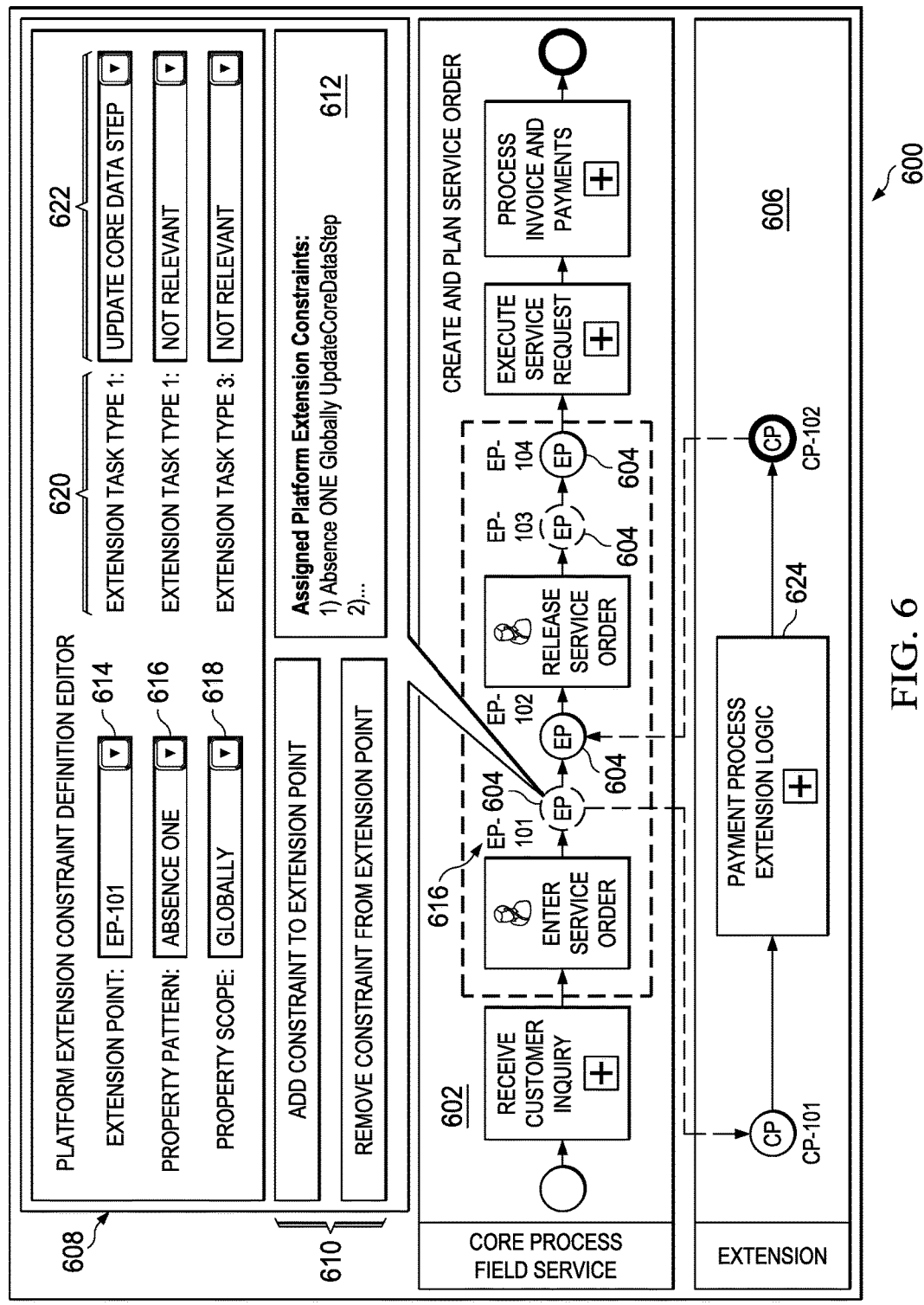
FIG. 6 is a block diagram illustrating an example user interface for annotating a process with extension points 604, according to an implementation.

FIG. 6 is a block diagram illustrating an example user interface 600 for annotating a process 602 with extension points 604, according to an implementation. For example, FIG. 6 shows how the SaaS provider can annotate the extension points 604 of the process 602 (e.g., the core process "Field Service") with platform extension constraints using an extension 606. The user interface 600, for example, can present the process 602 to the user, from which the user can select one of the extension points 604 to be annotated. An annotation definition area 608 can be presented. Controls 610 in the annotation definition area 608 can allow the user to selectively add a new constraint or remove a selected constraint for a currently selected extension point 604. Current constraints can be listed in an extension point constraints list 612. Fields associated with the constraint can be defined in a platform extension constraint definition editor 614. An extension point name 614 (e.g., EP-101), displayed in the annotation definition area 608, matches an extension point label 616 on the displayed process 602. Using the editor 614, for example, the user can define a property pattern 616, a property scope 618, and extension task types 620 (e.g., Update Core Data Step). In the current example, updating the core data step can be accomplished using the extension 606 in which the user can edit the functionality of payment process extension logic 624. Other implementations of the user interface 600 are possible. Moreover, the contents of the annotation definition area 608 can be different for different types of extension points.

Figure 7:
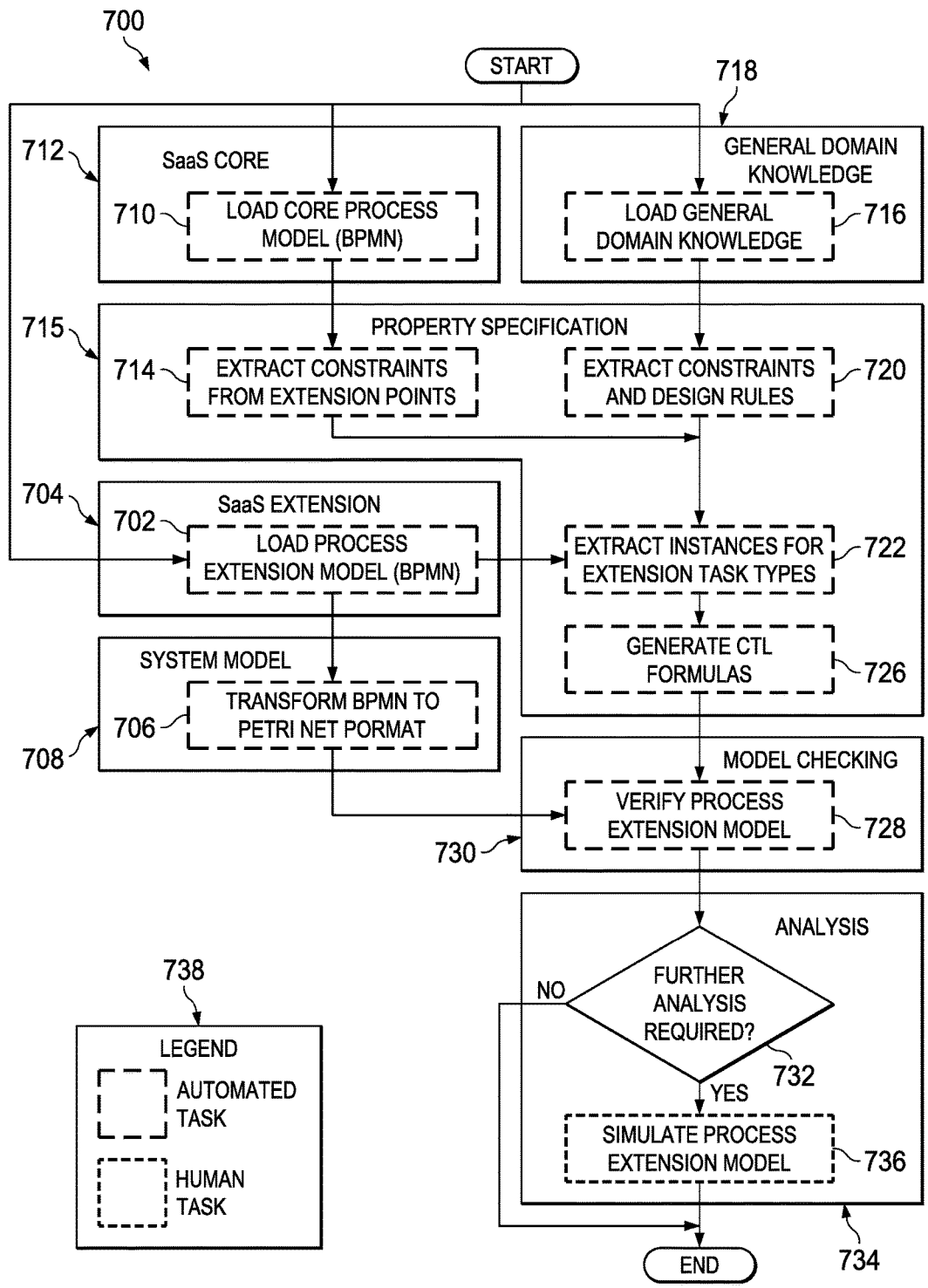
FIG. 7 is a flow diagram of an example process extension model checking algorithm, according to an implementation.

FIG. 7 is a flow diagram of an example process extension model checking algorithm 700, according to an implementation. The algorithm 700 uses, for example, a core set of frequently used BPMN elements that are mapped to Petri net modules. At 702, the process extension model is loaded (e.g., by a SaaS extension 704). At 706, the BPMN model is automatically transformed (e.g., by a system model 708) into a Petri net formalization that builds the foundation for the formal verification of this process extension model. The algorithm can generate at least two specific formats of Petri net representations: a Petri net model for a low-level analyzer), and model-checking tool.

At 710, the core process model (e.g., BPMN) is loaded (e.g., by a SaaS core 712). At 714, the platform extension constraints are extracted from the respective extension point into which the extension has been plugged in (e.g., by a property specification 715). Optionally, relevant platform extension constraints related to the general domain knowledge can be loaded at 716 (e.g., by a general domain language 718). At 720, constraints and design rules are extracted.

In order to generate the CTL formulas for the extended property specification patterns, the algorithm can first determine all task instances for each extension task type that is used within a constraint expression. For example, at 722, instances for extended task types are extracted, and at 726, the CTL formats are generated. Both, the Petri net of the process extension model and the CTL formulas are finally input for a model checking component 730, where at 728, the process extension model is verified.

To verify platform extension constraints, a mapping can be defined for a subset of BPMN modeling elements to Petri nets. For example, Petri nets can be used as the underlying formalization language due to the availability of efficient model checking algorithm and supporting tools. The BPMN standard can provide a very wide spectrum of modeling elements and diagram types. For the mapping, a core set of the most frequently used BPMN elements can be selected. The selection can be completed, for example, based on an association and alignment with the most frequently-used BPMN modeling elements.

In order to be able to refer to extension task instances as atomic propositions within constraints expressions, BPMN activities, events and gateways can be mapped to explicit places within the Petri net model that again can be referenced within CTL formulas. Detailed mappings are described below. The mappings can make use of Petri net transitions that have no label (or so called "silent" transitions). These transitions capture, for example, internal actions that cannot be observed by external users. Internally, the framework can generate a canonical Petri net format which can then be serialized, for example, into a native format for the LoLA model-checking tool and in Petri net Markup Language format that can further be used for simulation purposes. For example, at 732, a determination is made whether further analysis is required (e.g., by an analysis module 734). At 736, simulation of the process extension model can occur. The transformation approach can be related to one or more mapping specifications. However, the main difference is that, in the mapping, the BPMN elements activities, events and gateways can be mapped to explicit Petri net places, allowing formulation of atomic propositions in CTL relating to extension task instances. This allows the modeling of split and join behavior of activities to be very flexible by allowing multiple outbound and inbound sequence flows for a given activity. For example, an activity need not be restricted to a single entry and single exit model. A legend 738 includes an example key that identifies which steps in the process 700 are either automated tasks or human tasks.

In some implementations, a model checking tool (e.g., LoLA) can be used to verify whether a process extension model satisfies a given set of platform extension constraints. For example, the tool can verify a broad variety of behavioral properties on a given Petri net. The tool can be based, for example, on explicit state space verification (e.g., an exhaustive enumeration of reachable states), and the tool can leverage several state-of-the-art state space reduction techniques. The techniques, for example, can have the effect that only a small portion of the overall state space is explored, which may behave equivalently to the original state space with respect to explored portion. The tool can also support the evaluation of CTL formulas. For Petri nets, for example, a formula can be recursively constructed, such that every comparison is a CTL formula. A comparison can consist, for example, of a place name, an operator (e.g., one of < > <= >= = <> #), and a natural number. A marking can satisfy a comparison, for example, if the number of tokens on the specified places is in the specified relation to the given number. The Boolean operators AND, OR, and NOT can be used, and a CTL formula can be valid if it is satisfied by the initial marking of the net.

Figure 8:
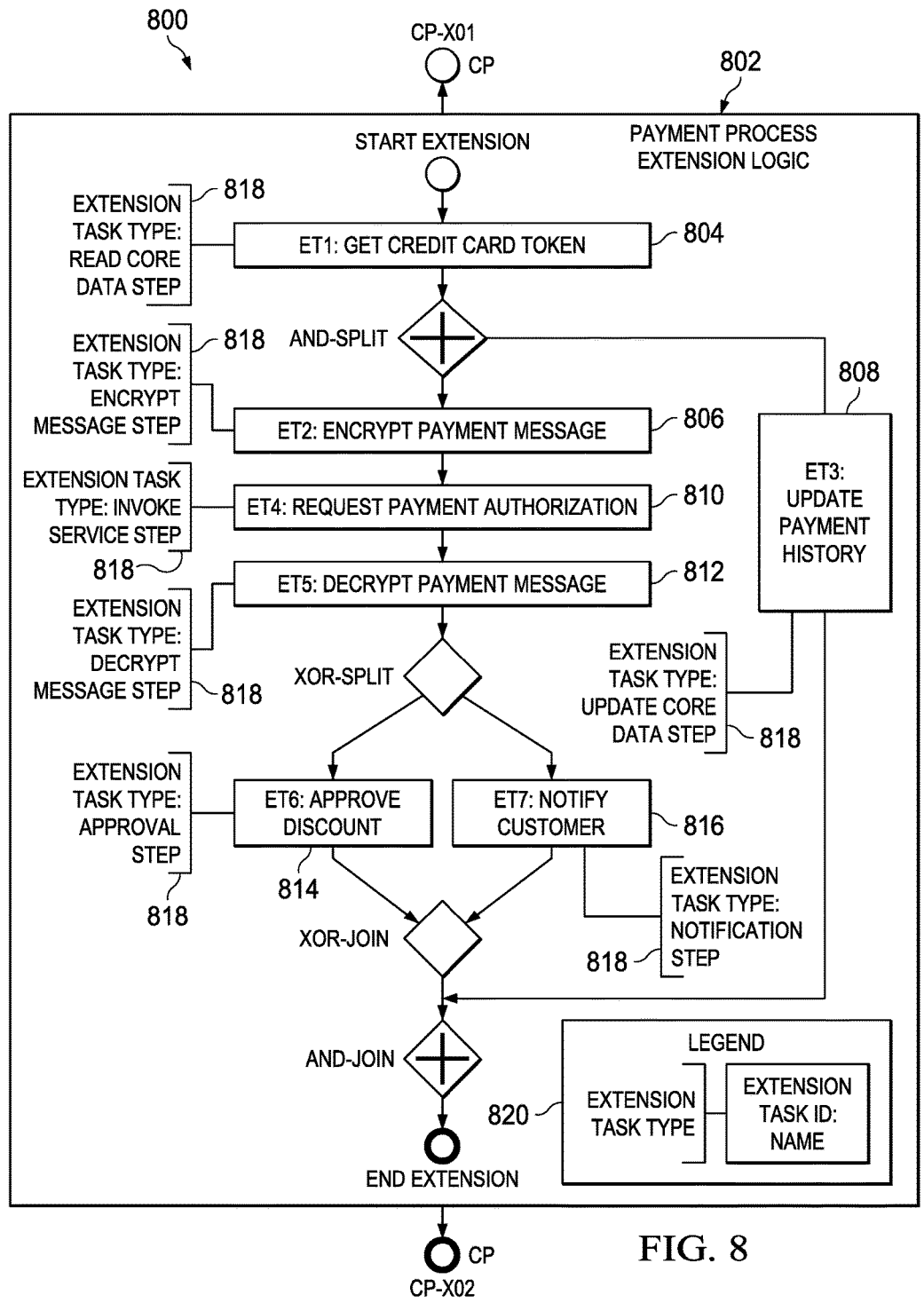
FIG. 8 is a block diagram illustrating an example flow of extension logic for a payment process extension, according to an implementation.

FIG. 8 is a block diagram illustrating an example flow 800 of extension logic 802 for a payment process extension, according to an implementation. For example, BPMN notation can be used for the extension logic 802. In this example, a core reference process shipped by a SaaS provider has been extended in order to integrate with an external payment card provider for credit card verification. Each extension task 804-816 has a unique identifier (e.g., ET1), a name, and a related extension task type 818 that is shown in using a BPMN annotation symbol, with a meaning as indicated by a legend 820.

In this example, assume that six platform extension constraints need to be fulfilled by the payment process extension, as shown in Table 4:

TABLE 4

Sample Platform Extension Constraints

| ID | Source of Constraint | Platform Extension Constraint Expression |
|---|---|---|
| C1 | Extension Point | ABSENCE ALL Create Core Data Step GLOBALLY |

TABLE 4-continued

Sample Platform Extension Constraints

| ID | Source of Constraint | Platform Extension Constraint Expression |
|---|---|---|
| C2 | Extension Point | ABSENCE ALL Delete Core Data Step GLOBALLY |
| C3 | Extension Point | ABSENCE ALL Update Core Data Step GLOBALLY |
| C4 | General Knowledge | EXISTENCE ONE Encrypt Message Step GLOBALLY |
| C5 | General Knowledge | EXISTENCE ONE Decrypt Message Step GLOBALLY |
| C6 | General Knowledge | RESPONSE ONE Decrypt Message Step ONE Encrypt Message Step GLOBALLY |

The sample platform constraints can be grouped into two categories. A first category (e.g., constraints from extension points) can include constraints C1 to C3. Using the constraints, for example, a provider of the core enterprise system can assure that every extension fragment that extends the core process "Field Service and Repair" at extension point EP-101 can only read data from the core system. Further, the process extension would not be allowed to create, delete or update core data. For this purpose, the three constraints C1 to C3 can be defined using the extended ABSENCE pattern A second category (e.g., constraints from general domain knowledge) can include constraints C4 to C6. These three sample extension constraints can illustrate how general design rules can be verified on process extensions. For example, if there is a message encryption step and a message decryption step in the process extension, the message encryption step must always be followed by the message decryption step. This requirement can be expressed, for example, by using the extended EXISTENCE pattern to both extension task types and by using the extended RESPONSE pattern to verify the ordering of related tasks.

Figure 9A:
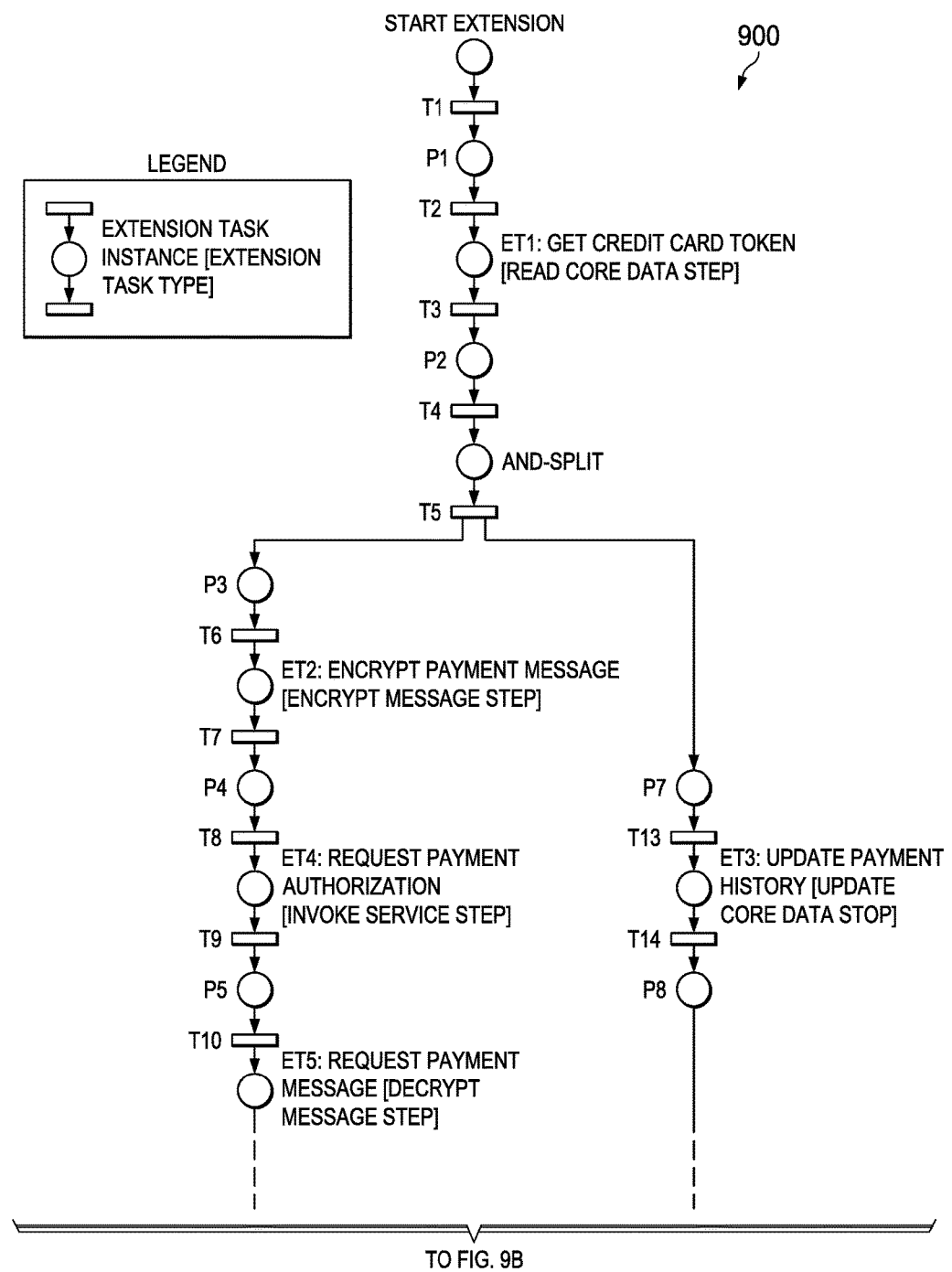
FIGS. 9A and 9B are block diagrams illustrating an example of a payment process extension shown in Petri net formalization notation, according to an implementation.
Figure 9B:
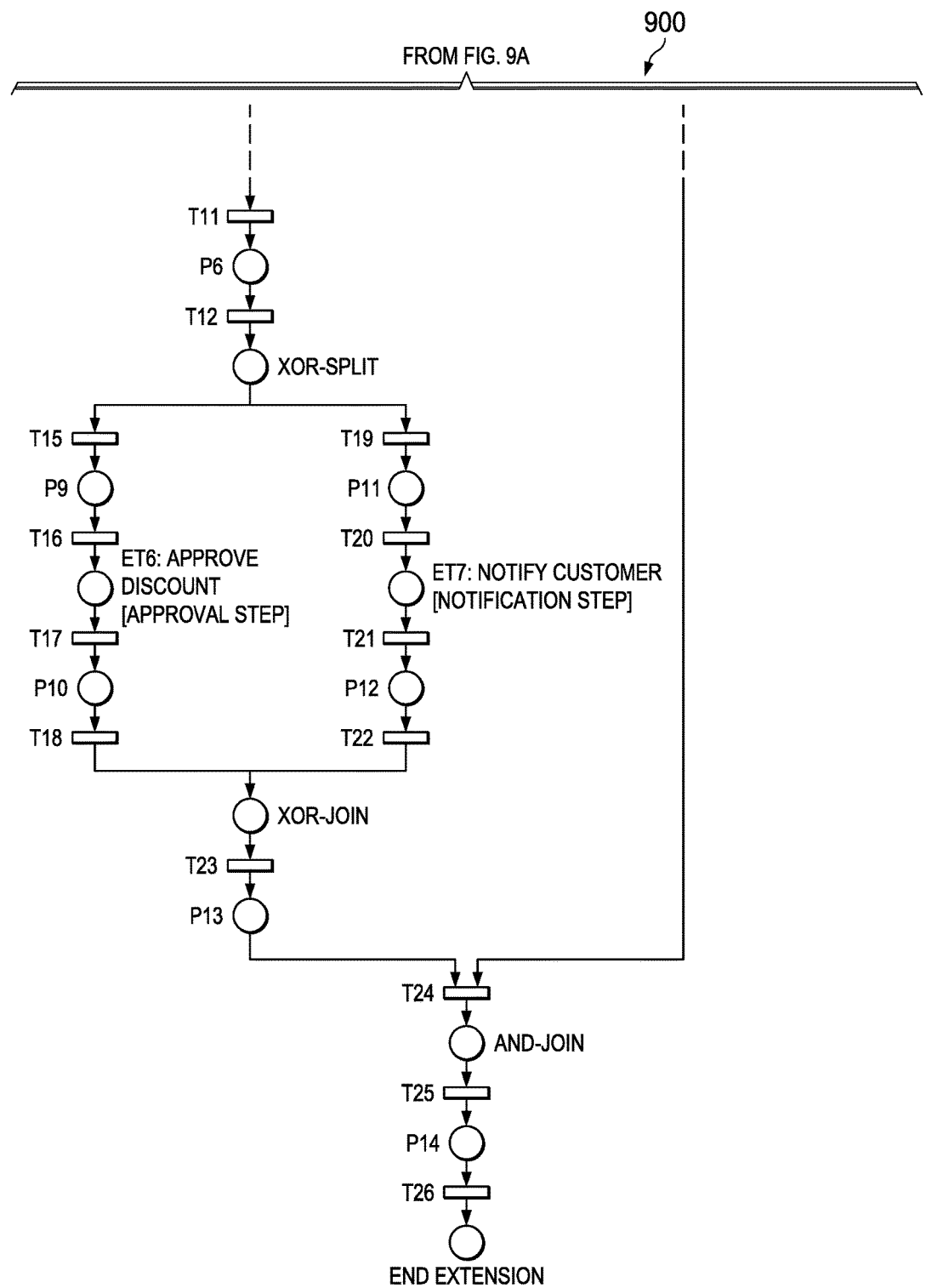

FIGS. 9A and 9B are block diagrams illustrating an example of a payment process extension 900 shown in Petri net formalization notation, according to an implementation. For example, the extension 900 is a Petri net formalization equivalent of the BPMN model shown in FIG. 8, e.g., transformed into the Petri net format according to the mapping specification introduced above.

In some implementations, before CTL formulas are generated, a process extension verification engine can query all task instances from the process extension model. For each task, the related extension task type can be determined, as shown in Table 5.

TABLE 5

Payment Extension Process - Extension Tasks

| ID | Extension Task Name | Extension Task Type |
|---|---|---|
| ET1 | Get Credit Card Token | Read Core Data Step |
| ET2 | Encrypt Payment Message | Encrypt Message Step |
| ET3 | Update Payment History | Update Core Data step |
| ET4 | Request Payment Authorization | Invoke Service Step |
| ET5 | Decrypt Payment Message | Decrypt Message Step |
| ET6 | Approve Discount | Approval Step |
| ET7 | Notify Customer | Notification Step |

FIG. 10 is a block diagram illustrating example generated CTL formulas for platform extension constraints, according to an implementation. For example, for each platform extension constraint that refers (e.g., in one of its operands) to an extension task type referenced in the process extension model (See Table 5), a corresponding CTL formula can be generated as listed in FIG. 10:

CTL formulas listed in FIG. 10 can be expressed, for example, using a syntax of a model checking. Table 6 shows example verification results for the payment extension process:

TABLE 6

Process Model Checking Results

| ID | Platform Extension Constraint Expression | Result |
| --- | --- | --- |
| C1 | ABSENCE ALL Create Core Data Step GLOBALLY | Satisfied |
| C2 | ABSENCE ALL Delete Core Data Step GLOBALLY | Satisfied |
| C3 | ABSENCE ALL Update Core Data Step GLOBALLY | Not Satisfied |
| C4 | EXISTENCE ONE Encrypt Message Step GLOBALLY | Satisfied |
| C5 | EXISTENCE ONE Decrypt Message Step GLOBALLY | Satisfied |
| C6 | RESPONSE ONE Decrypt Message Step ONE Encrypt Message Step GLOBALLY | Satisfied |

Figure 11:
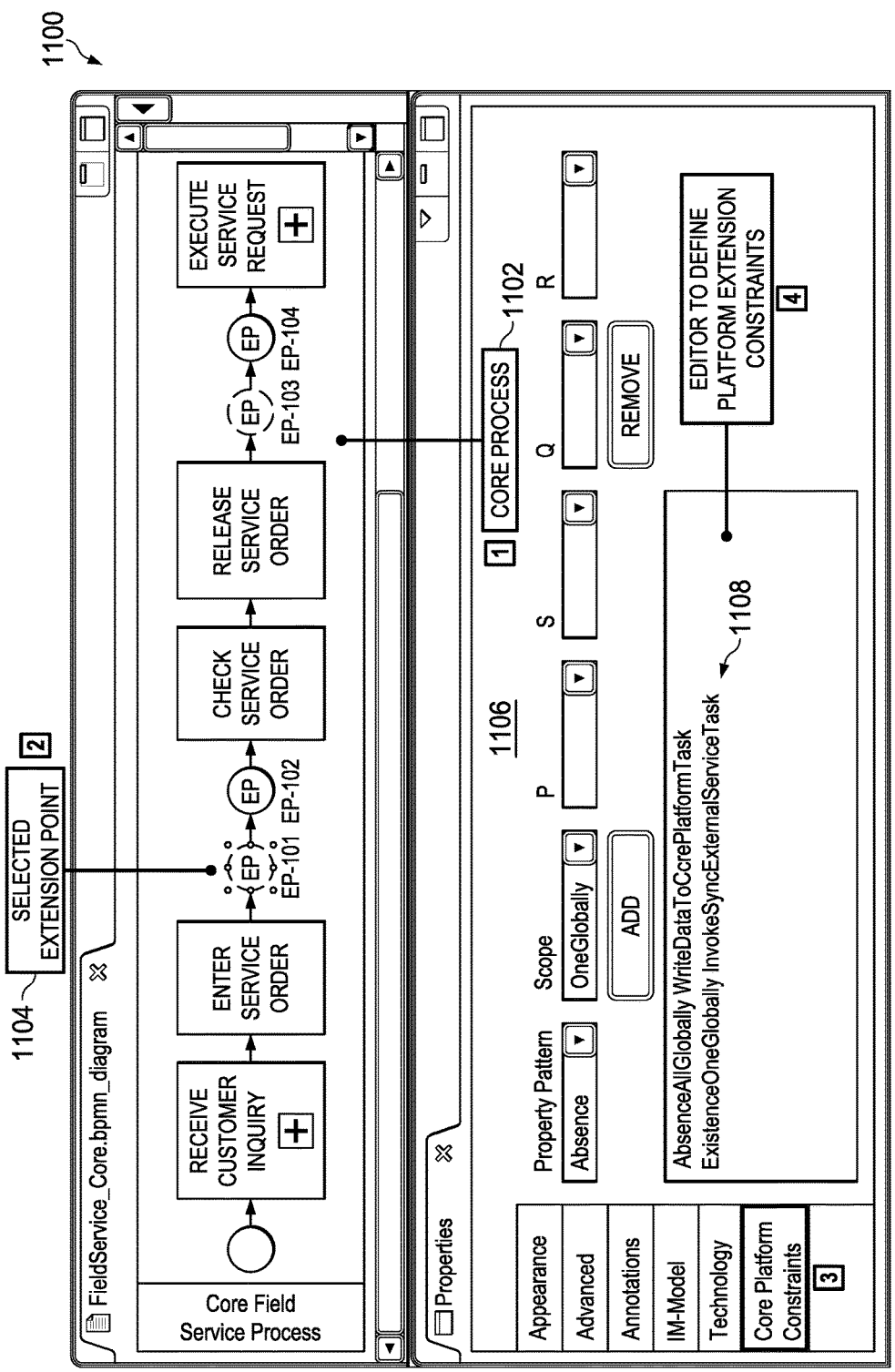
FIG. 11 is a block diagram illustrating example contents of a platform extension constraint definition editor 1100 that has been extended from an existing Business Processes Modeling and Notation (BPMN) modeling tool, according to an implementation.

FIG. 11 is a block diagram illustrating example contents of a platform extension constraint definition editor 1100 that has been extended from an existing BPMN modeling tool, according to an implementation. For example, for a core process 1102, an extension point 1104 is selected. The selection can result, for example, in the display of a properties area 1106 in which platform extension constraints 1108 can be defined.

Figure 12:
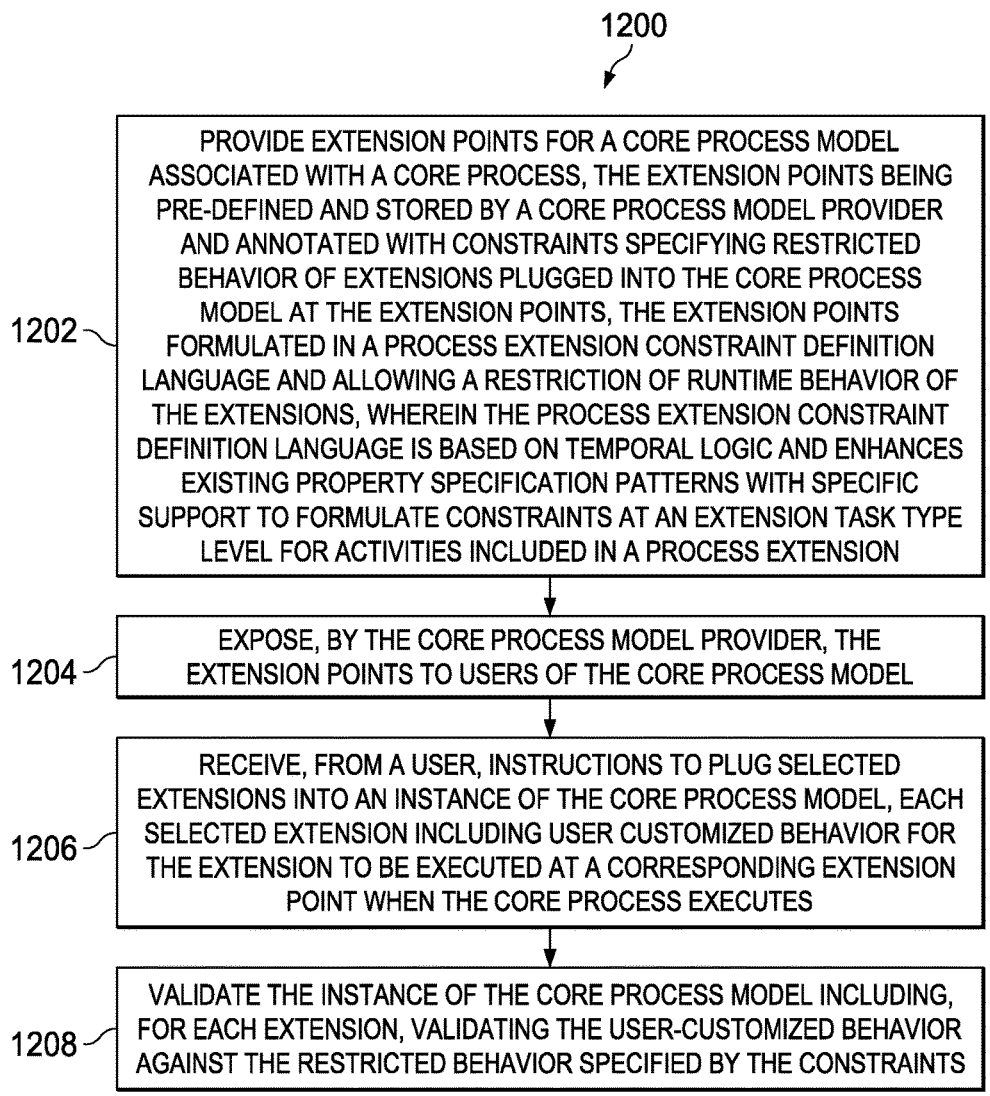
FIG. 12 is a flowchart of an example method for validating extensions plugged into a core process model, according to an implementation.

FIG. 12 is a flowchart of an example method 1200 for validating extensions plugged into a core process model, according to an implementation. For clarity of presentation, the description that follows generally describes method 1200 in the context of FIGS. 1-11.

At 1202, extension points are provided for a core process model associated with a core process, the extension points being pre-defined and stored by a core process model provider and annotated with constraints specifying restricted behavior of extensions plugged into the core process model at the extension points, the extension points formulated in a process extension constraint definition language and allowing a restriction of runtime behavior of the extensions, wherein the process extension constraint definition language is based on temporal logic and enhances existing property specification patterns with specific support to formulate constraints at an extension task type level for activities included in a process extension. For example, a SaaS provider 130 can use the platform extension constraint definition editor 112 to add extension points to a core process model. In another example, the SaaS provider 206 can provide the core platform extension constraints 210. The process extension modeler 118, for example, can expose a language by which the SaaS customer/partner 128 can define extension points for a core process. Based on the inputs of the SaaS customer/partner 128, for example, the extension points that are defined can restrict the run-time behavior of a process that follows the core process model that is extended. From 1202, method 1200 proceeds to 1204.

At 1204, the extension points are exposed, by the core process model provider, to users of the core process model. The platform extension constraint definition editor 1100, for example, can expose extension points associated with the core process 1102, including exposing the selected extension point 1104. From 1204, method 1200 proceeds to 1206.

In some implementations, the extension points are part of an application domain included in a software-as-a-service (SaaS), cloud-based enterprise system that extends reference processes provided by a SaaS provider to customers and partners. For example, the extension points can be provided by the SaaS reference process repository 110.

At 1206, instructions are received from a user to plug selected extensions into an instance of the core process model, each selected extension including user-customized behavior for the extension to be executed at a corresponding extension point when the core process executes. For example, using the properties area 1106 for the selected extension point 1104, the user (e.g., the SaaS customer/partner 202) can specify specific parameters and behavior (e.g., in a process extension 204) for the selected extension point 1104, including platform extension constraints 1108. From 1206, method 1200 proceeds to 1208.

At 1208, the instance of the core process model is validated including, for each extension, validating the user-customized behavior against the restricted behavior specified by the constraints. For example, the core process 1102 that is saved by the user can go through a validation process such as the process extension model check 214. After 1208, method 1200 stops.

In some implementations, the method 1200 further comprises transforming the core process into a different format before validating the instance of the core process model. For example, the BPMN format 402 of the core process can be transformed into the Petri net format 404 of the core process before the process extension model check 214 is executed.

In some implementations, validating the instance of the core process model includes process extension model checking based on CTL and property specification patterns. For example, the infinite computation tree 302 corresponding to the transition system 300 can be used for verification, as described above. Further, patterns used in Table 2, identifying specific states/events of the system model, can be used for verification.

In some implementations, validating the instance of the core process model can include using constraint semantics indicating a relevancy and a behavior of validation rules for extension task instances. For example, referring to FIG. 4, the constraint semantics 410 and 412 can be used as two interpretation semantics when applying the pattern to extension task types, as described above.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method comprising:
providing extension points for a core process model associated with a core process, the extension points being pre-defined and stored by a core process model provider and annotated with constraints specifying restricted behavior of extensions plugged into the core process model at the extension points, the extension points formulated in a process extension constraint definition language and allowing a restriction of runtime behavior of the extensions, wherein the process extension constraint definition language is based on temporal logic and enhances existing property specification patterns with specific support to formulate constraints at an extension task type level for activities included in a process extension;
exposing, by the core process model provider, the extension points to users of the core process model;
receiving, from a user, instructions to plug selected extensions into an instance of the core process model, each selected extension including user-customized behavior for the extension to be executed at a corresponding extension point when the core process executes; and validating the instance of the core process model including, for each extension, validating the user-customized behavior against the restricted behavior specified by the constraints.

2. The method of claim 1, further comprising transforming the core process into a different format before validating the instance of the core process model.

3. The method of claim 1, wherein validating the instance of the core process model includes process extension model checking based on computational tree logic (CTL) and property specification patterns.

4. The method of claim 1, wherein validating the instance of the core process model includes using constraint semantics indicating a relevancy and a behavior of validation rules for extension task instances.

5. The method of claim 1, wherein the extension points are part of an application domain included in a software-as-a-service (SaaS), cloud-based enterprise system that extends reference processes provided by a SaaS provider to customers and partners.

6. A system comprising:
memory storing:
data stores including information about core process models and associated extension points; and
an application for providing instructions including:
providing extension points for a core process model associated with a core process, the extension points being pre-defined and stored by a core process model provider and annotated with constraints specifying restricted behavior of extensions plugged into the core process model at the extension points, the extension points formulated in a process extension constraint definition language and allowing a restriction of runtime behavior of the extensions, wherein the process extension constraint definition language is based on temporal logic and enhances existing property specification patterns with specific support to formulate constraints at an extension task type level for activities included in a process extension;
exposing, by the core process model provider, the extension points to users of the core process model;
receiving, from a user, instructions to plug selected extensions into an instance of the core process model, each selected extension including user-customized behavior for the extension to be executed at a corresponding extension point when the core process executes; and
validating the instance of the core process model including, for each extension, validating the user-customized behavior against the restricted behavior specified by the constraints.

7. The system of claim 6, the instructions further comprising: transforming the core process into a different format before validating the instance of the core process model.

8. The system of claim 6, wherein validating the instance of the core process model includes process extension model checking based on computational tree logic (CTL) and property specification patterns.

9. The system of claim 6, wherein validating the instance of the core process model includes using constraint semantics indicating a relevancy and a behavior of validation rules for extension task instances.

10. The system of claim 6, wherein the extension points are part of an application domain included in a software-as-a-service (SaaS), cloud-based enterprise system that extends reference processes provided by a SaaS provider to customers and partners.

11. A non-transitory computer-readable media encoded with a computer program, the program comprising instructions that when executed by one or more computers cause the one or more computers to perform operations comprising:
providing extension points for a core process model associated with a core process, the extension points being pre-defined and stored by a core process model provider and annotated with constraints specifying restricted behavior of extensions plugged into the core process model at the extension points, the extension points formulated in a process extension constraint definition language and allowing a restriction of runtime behavior of the extensions, wherein the process extension constraint definition language is based on temporal logic and enhances existing property specification patterns with specific support to formulate constraints at an extension task type level for activities included in a process extension;
exposing, by the core process model provider, the extension points to users of the core process model;
receiving, from a user, instructions to plug selected extensions into an instance of the core process model, each selected extension including user-customized behavior for the extension to be executed at a corresponding extension point when the core process executes; and
validating the instance of the core process model including, for each extension, validating the user-customized behavior against the restricted behavior specified by the constraints.

12. The non-transitory computer-readable media of claim 11, the instructions further comprising transforming the core process into a different format before validating the instance of the core process model.

13. The non-transitory computer-readable media of claim 11, wherein validating the instance of the core process model includes process extension model checking based on computational tree logic (CTL) and property specification patterns.

14. The non-transitory computer-readable media of claim 11, wherein validating the instance of the core process model includes using constraint semantics indicating a relevancy and a behavior of validation rules for extension task instances.

15. The non-transitory computer-readable media of claim 11, wherein the extension points are part of an application domain included in a software-as-a-service (SaaS), cloud-based enterprise system that extends reference processes provided by a SaaS provider to customers and partners.

* * * * *